(12) United States Patent
LaGrotta et al.

(10) Patent No.: US 6,477,361 B1
(45) Date of Patent: Nov. 5, 2002

(54) REMOTE POWER-DOWN CONTROL OF WIRELESS TERMINAL

(75) Inventors: Richard Thomas LaGrotta, Livingston; James T LaGrotta, Boonton, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/576,469

(22) Filed: May 23, 2000

(51) Int. Cl.[7] .................................................. H04B 1/16
(52) U.S. Cl. ....................... 455/343; 455/574; 340/7.32
(58) Field of Search ................................. 455/574, 343, 455/422, 69, 70, 67.1, 413, 414; 340/7.1, 7.2, 7.32, 7.33, 7.38

(56) References Cited

U.S. PATENT DOCUMENTS

| | | | |
|---|---|---|---|
| 5,128,938 A | * 7/1992 | Borras | 455/343 |
| 5,241,542 A | * 8/1993 | Natarajan et al. | 455/343 |
| 5,590,396 A | 12/1996 | Henry | 455/33.1 |
| 5,678,192 A | 10/1997 | Paavonen et al. | 455/38.3 |
| 5,710,975 A | 1/1998 | Bernhardt et al. | 455/38.3 |
| 5,821,873 A | 10/1998 | Lerner et al. | 340/825.44 |
| 6,128,485 A | * 10/2000 | Mori et al. | 455/422 |
| 6,208,852 B1 | * 3/2001 | Konishi | 455/414 |

* cited by examiner

*Primary Examiner*—Doris H. To

(57) ABSTRACT

On instructions obtained from a subscriber, a wireless terminal service provider sends a power-down signal to a wireless terminal. Upon receipt of the power-down signal, the wireless terminal goes into a sleep state. In this state, all monitoring functions other than time, date and elapsed time are turned off. The power-down signal sets a clock, which can be located within the wireless terminal, to awaken the wireless terminal at the end of a discrete interval of time by powering-up the monitoring circuits. The wireless terminal service provider, by knowing the power-down/power-up time cycle of the wireless terminal, can alert a party attempting to contact the wireless terminal during the power-down period that the called party cannot be reached. The wireless terminal service provider can also offer various options to the calling party, such as providing the time when the called wireless terminal will next be on, offer to take a message which can be sent when the called wireless terminal is next on, offer to cancel any further attempt to send the message to the called wireless terminal, etc. Normally, the power-down control signal will condition the wireless terminal to assume the sleep state for a discrete interval of time. Extended intervals of time can be obtained by resending the control signal at the end of the discrete interval of time. If desired, a two-part control signal can be sent to the wireless terminal where one part conditions the wireless terminal to assume the power-down state and the other part controls the duration of the power-down state.

20 Claims, 3 Drawing Sheets

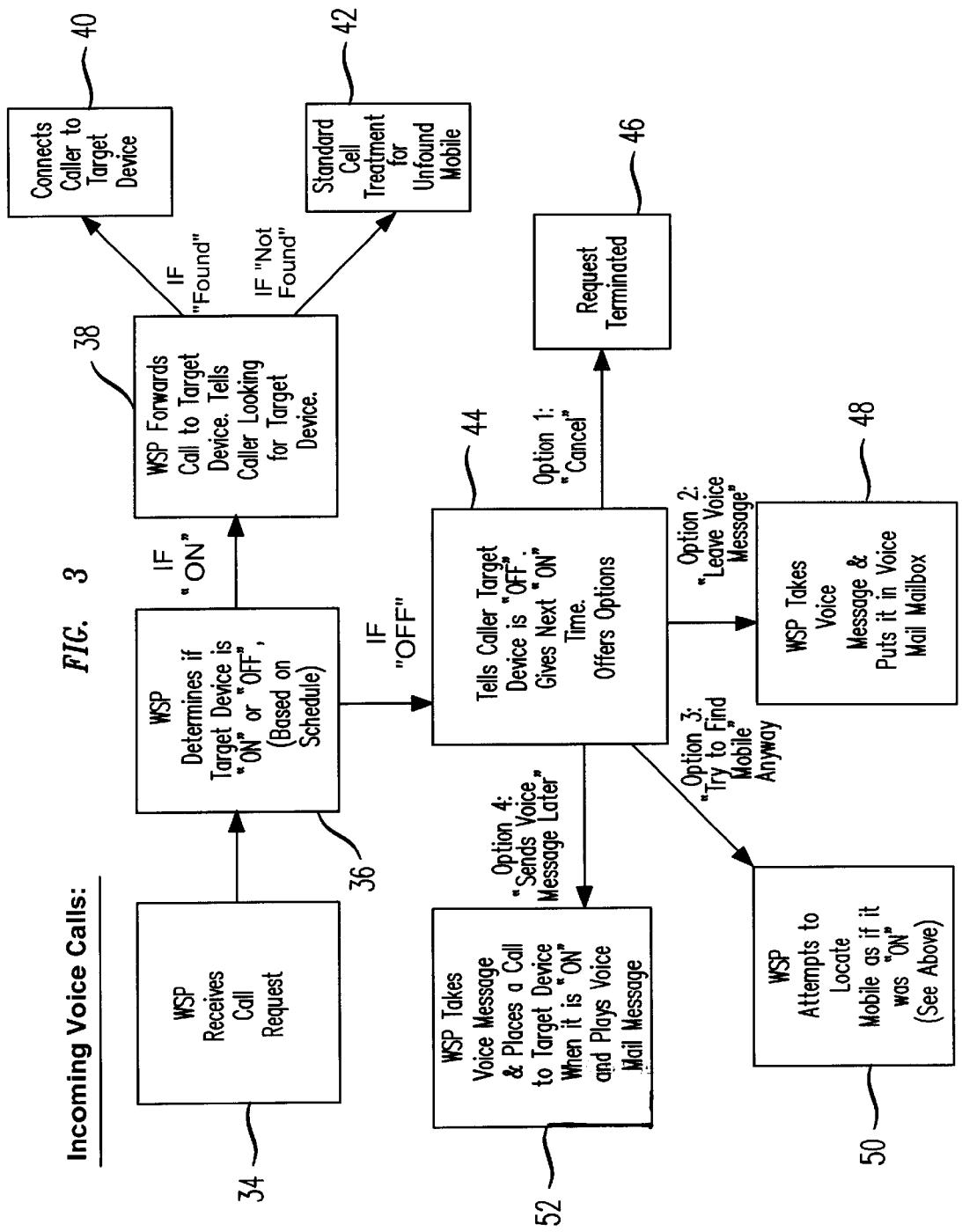

REMOTE POWER-DOWN CONTROL OF WIRELESS TERMINAL

BACKGROUND OF THE INVENTION

1. Field of the Invention

This invention relates generally to a class of equipment known as wireless terminals such as mobile telephones and pagers; and, more specifically, to selectively controlling the powering-down and duration of the power-down time of a wireless terminal.

2. Description of the Prior Art

Wireless terminals such as pagers and mobile telephones are being used more extensively by more people for more varied purposes each year. A pager is generally used by a calling party to alert a called party that someone is trying to contact him. This is usually done by the caller calling a Personal Telephone Number (PTN) assigned to a pager subscriber by a pager service provider. The pager, normally a small device carried in a pocket or on the belt of a subscriber, displays the telephone number of the caller and emits an audible sound such as a beep, or vibrates, to alert the subscriber that a call has been sent to his pager. Once alerted, the subscriber, upon seeing the number, goes to a telephone to call the number displayed. As technology has grown, pagers have evolved from providing only telephone numbers to providing more complex alphanumeric messages. They are even capable of accessing other services such as locating restaurants or hotels, perform banking functions, obtaining stock market reports and the like. Mobile telephones are somewhat more user friendly as they allow a caller to talk directly to the called person at the instant that the call is made, provided the person being called answers the telephone.

At the present time, the use of wireless terminals such as pagers and mobile telephones is widespread and their use is continuing to grow. Currently, users of pagers and mobile telephones must manually power-up and power-down their wireless terminal. This is normally done to conserve power and/or to stop incoming messages. Frequently, in an attempt to avoid interruptions and/or conserve battery life, a wireless terminal will be turned off during selected hours of the day and/or night. For example, a mobile telephone may be turned off when the user is at work and does not want to be disturbed by an incoming message or when he is at home and has access to a wired telephone. Often, when a subscriber becomes aware that the battery in the wireless terminal is low, in an attempt to conserve battery power, he will take his wireless terminal out of service by selectively turning it off until it is actually needed.

Although a time out of service procedure initiated by the subscriber by turning off the wireless terminal provides a method for dealing with the problem of low battery power, the procedure has drawbacks. One drawback of turning the wireless terminal off is that at least one more call must be made by the caller to the mobile telephone or to the pager to contact the person being called. Another drawback is that when a call is made to a pager that is off, the caller is not aware that the message was not received by the pager and the called person is not aware that someone has tried to reach his pager. Consequently, neither the calling person nor the called person is aware that the message never went through. In each instance, the subscriber will miss a call and not be aware that a call was missed.

SUMMARY OF THE INVENTION

On instructions obtained from a wireless terminal subscriber, a wireless terminal service provider sends a power-down control signal to a wireless terminal. Upon receipt of the power-down control signal, the wireless terminal goes into a sleep mode for a discrete interval of time. In this mode all monitoring functions other than time, date and elapsed time are turned off. At the end of the discrete interval of time, the wireless terminal is automatically powered up. Resending the power-down signal will extend the duration of the power-down state of the wireless terminal. In another embodiment, the control signal can consist of two parts. One part can be the power-down control signal and the other part can be the power-down time duration control signal. The power-down time duration signal determines the duration of the sleep mode. The time duration signal sets a clock which times the sleep mode. At the end of the sleep mode period, the monitoring circuits are powered-up and the wireless terminal is awoke. The wireless terminal service provider (WTSP), by knowing the power-down/power-up time cycle of the wireless terminal, can alert a party attempting to contact the wireless terminal during the power-down period that the wireless terminal being called cannot be reached. The WTSP can also offer other service options. For example, the WTSP can provide the time when the called wireless terminal will next be powered-up, can offer to take a message which will be sent when the called wireless terminal is next powered-up, can offer to cancel any further attempt to send the message to the called wireless terminal, etc.

BRIEF DESCRIPTION OF THE DRAWINGS

FIG. 3 is a flow diagram of the method of the present invention of processing an incoming call for transmission to a mobile telephone.

DETAILED DESCRIPTION OF THE PREFERRED EMBODIMENT

Figure 1:
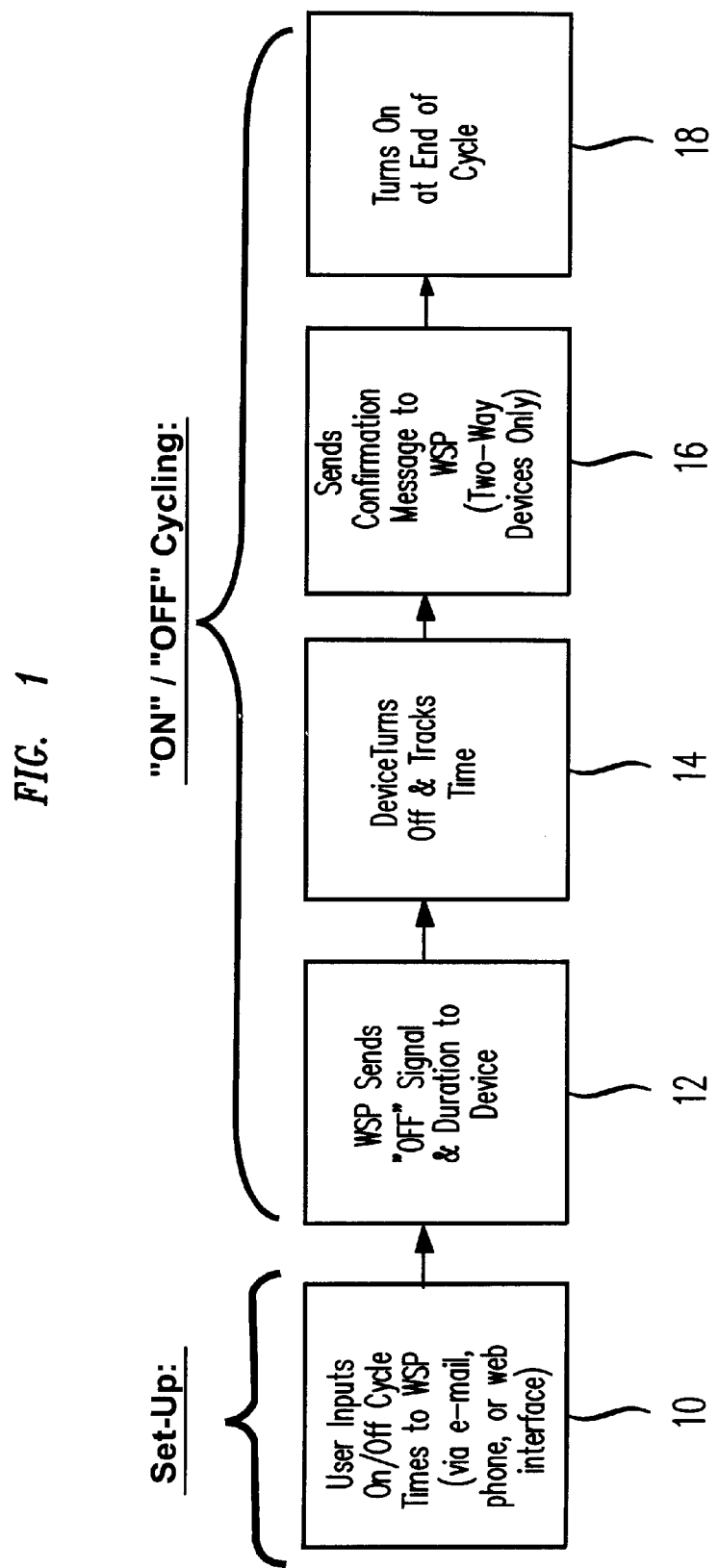
FIG. 1 is a flow diagram of the method of the present invention of set up; and of powering down and powering up a wireless terminal.

With one-way wireless terminals such as pagers, the wireless terminal service provider (WTSP) has no way of knowing if the pager is on or off and, therefore, can only broadcast messages blindly into the service area. In addition, if a pager is turned off, the WTSP has no information about when the pager will again be turned on. But, if the pager is off, and the WTSP knows the time that the pager will next be turned on, the WTSP will be in a position to resend the page message to a pager that is now active. In addition, by knowing the on-off time cycle of the pager, the WTSP can "tell" the calling party that the pager is off and when it will again be on and in condition to receive a page message.

With two-way wireless terminals such as mobile telephones, the WTSP knows if the mobile telephone is on and if it is in the service area. However, if the mobile telephone is off, the WTSP does not know when it will again be on and in condition to receive an incoming call. Again, if the on-off time cycle of the mobile telephone is known by the WTSP, it will not only allow the WTSP to "tell" the caller that the mobile telephone is currently off and cannot receive any incoming calls, but the WTSP will also be able to report when the mobile telephone will be next on and in condition to receive the call.

In the present invention the WTSP knows when a wireless terminal is in a power-down state and also knows the time when it will be next turned on. Then, the WTSP can tell a caller to the wireless terminal during the power-down state that the wireless terminal that is being called is off and when it will next be on and in condition to receive a call. More specifically, in accordance with instructions from the subscriber, a command signal is sent by the WTSP, which powers down the wireless terminal. The timing of the control signal is based on subscriber-controlled parameters. The command to power-down the wireless terminal can be a one-day cycle, a 5/2 weekday/weekend cycle, a full 7-day cycle, or a calendar based, day-by-day cycle. The WTSP sends the power-down command signal together with a power-down time duration signal to the wireless terminal over its designated assigned frequency channel. The WTSP can also send the current day and time to the wireless terminal on a regular basis for display.

The WTSP subscriber can selectively program the power-down/power-up time cycle of the wireless terminal by using a web or telephone prompt system, thus eliminating the need to manually turn the wireless terminal on and off. Selectively controlling the power-down/power-up time cycle of the wireless terminal helps to reduce battery usage, particularly in pagers, which are often left on at all times. Unwanted interruptions, such as when the end user is at a meeting or desires quiet time, can now be selectively obtained without missing incoming calls as a message can be retransmitted at a later time when the wireless terminal is powered-up. Additionally, the calling party will know if the wireless device is powered-down and, if it is, when it will again be powered-up. Based on this information, the calling party can make a decision as to whether the message should still be sent, should it be resent at a later time when the wireless device is powered-up, should the message be canceled completely, etc. The wireless terminal can be equipped with a manual override to turn it on and off, or it can be set up for only automatic operation. Automatic operation may be desired when the device is provided to an employee with the expectation that it will be powered-up only during certain times/days, and it is desired to remove the end user's ability to power-down the wireless terminal.

The wireless terminal can be updated to send a battery status report to the WTSP. If the charge on the battery is below a set value, the WTSP can command the wireless terminal to turn itself off and then notify the person trying to send a message to the wireless terminal that it is off and cannot receive a message. The WTSP can also send a message directly to the wireless terminal reporting the low battery condition.

In the exemplary embodiment of the present invention, FIG. 1 is a flow diagram of the setting up and the powering-down and powering-up of a wireless terminal.

Set-Up

Initially, the owner of the wireless terminal contacts the wireless terminal service provider (WTSP), via e-mail, telephone, web interface, etc. to report the time that the wireless terminal is to be powered-down (step 10) and not in condition to receive an incoming call. The WTSP inputs the desired power-down time cycles received from the subscriber into a control memory. At the selected times, the WTSP transmits a control signal having two parts, a power-down part and a power-down time duration part control signal to the wireless terminal. In another embodiment, the power-down duration may be a fixed interval of time such as fifteen minutes, one-half of an hour, one hour and the like. In this instance, the control signal will be only a power-down signal which will power-down the wireless terminal for a fixed period of time. If the power-down time is to be extended, the power-down signal can be retransmitted when the wireless terminal awakens.

On/Off Cycle

The wireless terminal, in this instance a pager, contains an internal clock and control circuitry which is responsive to control signals received from the WTSP. The WTSP input contains in its control memory information about the on-off cycle times that the owner of the pager has selected. At the appropriate instant, from information obtained from its control memory, the WTSP transmits a power-down signal and a power-down time duration signal to the pager (step 12). The power-down signal drives the pager into a sleep mode and the power-down time duration signal tells the pager how long it should remain in the sleep mode. It is to be noted that when the pager is in the power-down state, it means that the pager is actually in a sleep mode and does not monitor signals. However, the pager is aware of time, date and elapsed time. In the sleep mode, the pager uses only minimum battery power, only that amount of power needed to operate the timing circuits. All other circuit operations are in the off state. Upon receipt of a power-down signal and a power-down time duration signal, the pager goes into the sleep mode, and the pager clock and timing circuitry begin to track the time duration of the sleep mode (step 14). If the pager is a two-way device, upon receipt of the power-down and power-down time duration signals, a confirmation signal can be sent from the pager to the WTSP (step 16). On completion of the sleep period, the pager awakens, goes into its power-up state (step 18) and is in conditioned to receive incoming messages.

Figure 2:
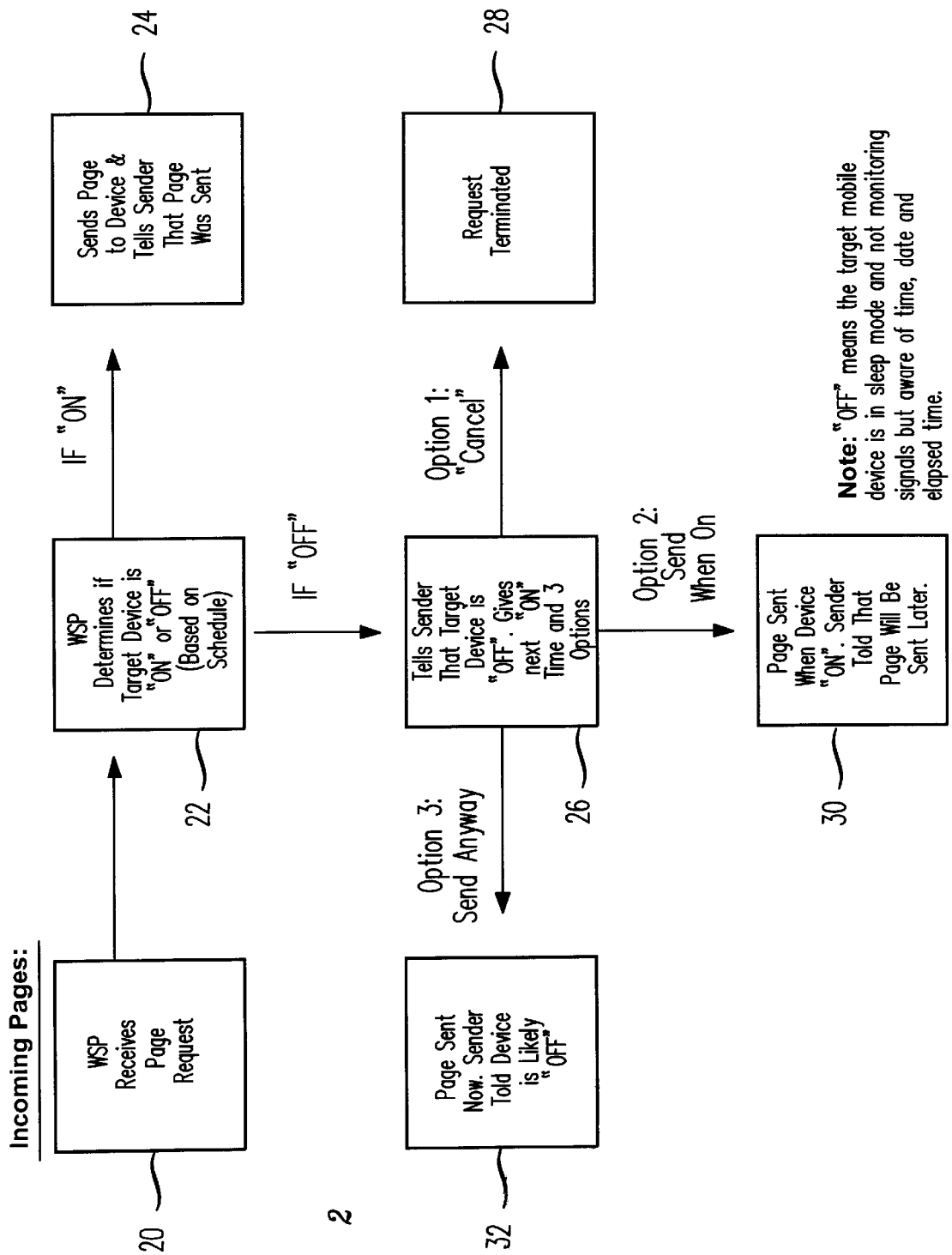
FIG. 2 is a flow diagram of the method of the present invention of processing an incoming message for transmission to a pager.

Incoming Page Message (FIG. 2)

At some instant the Wireless Provider Terminal Service (WTSP) receives a request, for example, an incoming telephone request, to transmit a page call to the pager (step 20). The WTSP interrogates its memory bank to determine if the pager is in its power-up state or in its power-down or sleep state (step 22). If the pager is in the power-up state, the WTSP sends the requested page message to the pager. If appropriate, the WTSP also sends a message to the caller confirming that the page message was sent (step 24). If, however, the WTSP determines from its memory bank that the pager is in the power-down or sleep state, the WTSP sends a message back to the caller reporting that the pager is off and also provides the time when the pager will be next on. Additionally, the WTSP can present three options to the caller (step 26). The first option can be a request to terminate the page call. Selection of this option by the caller will result in the page call being canceled (step 28). The second option can be a request to transmit the page call when the pager is next on. Selection of this option by the caller results in a message being sent to the caller acknowledging that the page call will be sent when the pager is next on and the page call can be stored in the WTSP memory bank for transmission to the pager when the pager is next on (step 30). The third option can be a request to send the page call now. Selection of this option by the caller will normally result in the page call being sent to the pager and a message being sent to the caller confirming that the page call was sent but, in all likelihood was not received as the pager is believed to be in a power-down state or off (step 32).

Incoming Voice Call (FIG. 3)

In the exemplary embodiment of the present invention, FIG. 3 is a flowchart showing the implementation of the operation of a mobile telephone in the preferred embodiment. In the beginning, as noted under "Set-Up" for the pager, the owner of the mobile telephone contacts the WTSP via e-mail, telephone, web interface, etc. to designate the desired power-off/power-on cycle times for the mobile telephone (step 10 of FIG. 1). Thereafter, as described above for the pager, the WTSP selectively sets the mobile telephone to a power-down or sleep state for a specified interval of time (steps 12, 14, 16 and 18 of FIG. 1), the mobile telephone being in the power-up state at all other times.

Incoming Voice Call

The WTSP receives a call for transmission to a mobile telephone (step 34). The WTSP queries its memory bank to determine if the mobile telephone is in the power-up state or the sleep state (step 36). If the information in the memory bank indicates that the mobile telephone is not in the sleep state, the WTSP forwards the call to the mobile telephone (step 38). At this time the WTSP message can be sent back to the calling party that a search is being made for the called party. If the called party is found, a connection is made and the calling party communicates with the called party (step 40). If the called party cannot be located, the message that is currently sent to the calling party by the WTSP, such as "the party you called has either reached his destination or has traveled out of the area", can be transmitted to the caller and the connection is terminated (step 42).

Returning to step 36, if the information in the memory bank indicates that the mobile telephone is in the sleep state, the WTSP sends a message back to the caller reporting that the mobile telephone is off. The message can also provide the next time when the mobile telephone will be on. In addition, the message can include four options for consideration by the caller (step 44). The first option can be a request to terminate the telephone call. Selection of this option by the caller results in the telephone call being canceled (step 46). The second option can be a request to leave a voice message. If the caller accepts this option, the caller leaves a voice message that the WTSP records in the voice mailbox of the called party for retrieval by the called party (step 48). The third option can be a request to authorize the WTSP to make numerous periodic attempts during a specific interval of time (over the next 45 minutes) to locate the called party. At the end, if the search is not successful, the WTSP can call the calling party to report the negative result (step 50). The fourth option can be a request to record a voice message which the WTSP will transmit as a phone call to the called party when the mobile telephone of the called party is next on (step 52).

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

What is claimed is:

1. A method of controlling a wireless terminal comprising the steps of:
sending a control signal from a wireless terminal service provider at a remote location to the wireless terminal to condition the wireless terminal to assume a power-down state ending at an ending time;
receiving a call at the wireless terminal service provider from a calling party for the wireless terminal; and
sending a signal to the calling party reporting the ending time if the call is received after sending the control signal and before the ending time.

2. The method of claim 1 further comprising steps of:
conditioning the wireless terminal to maintain the power-down state for the discrete interval of time upon receipt of the control signal and to assume a power-up state upon expiration of the discrete interval of time.

3. The method of claim 2 wherein the control signal sending step further comprises the step of:
sending a two-part control signal, one of the parts conditioning the wireless terminal to assume the power-down state and the other part conditioning the wireless terminal to maintain the power-down state for a discrete interval of time.

4. The method of claim 3 further comprising the step of:
sending a confirmation signal from the wireless terminal to the wireless terminal service provider confirming receipt of the control signal.

5. The method of claim 3 wherein the wireless terminal is a pager.

6. The method of claim 3 wherein the wireless terminal is a mobile telephone.

7. The method of claim 1 further comprising the step of:
after receiving the call from the calling party, determining if the wireless terminal is in a power-up state for receiving a message from the calling party.

8. The method of claim 7 further comprising the step of:
enabling the calling party to communicate with the called wireless terminal upon determining that the called wireless terminal is in a power-up state.

9. The method of claim 7 further comprising the step of:
sending a signal to the calling party reporting that the wireless terminal is not in condition to receive a message upon determining that the wireless terminal is not in a power-up state.

10. The method of claim 9 wherein the wireless terminal is a pager.

11. The method of claim 10 further comprising the step of:
sending a menu of options from the wireless terminal service provider to the calling party.

12. The method of claim 11, wherein the menu of options includes authorization for the wireless terminal service provider to attempt to contact the pager when it is next in a power-up state.

13. The method of claim 11, wherein the menu of options includes authorization for the wireless terminal service provider to not continue to attempt to contact the pager.

14. The method of claim 9 wherein the wireless terminal is a mobile telephone.

15. The method of claim 14 further comprising the step of sending a menu of options from the wireless terminal service provider to the calling party.

16. The method of claim 15 wherein the menu of options includes authorization for the wireless terminal service provider to receive a voice message from the calling party for insertion into a voice mailbox for subsequent transmission to the mobile telephone.

17. The method of claim 15 wherein the menu of options includes authorization for the wireless terminal service provider to receive a voice message from the calling party and to place a call to the mobile telephone when it is next in a power-up state and to then transmit the voice message.

18. The method of claim 15 wherein the menu of options includes authorization for the wireless terminal service provider to stop all efforts to complete the call.

19. The method of claim 1, wherein the sending step is performed in accordance with instructions sent to the wireless terminal service provider by its subscriber associated with the wireless terminal.

20. The method of claim 19, wherein the instructions are sent to the wireless terminal by email, by telephone, or by the world wide web.

* * * * *